Sept. 29, 1964    R. C. ROOT    3,151,308

HOUSING FOR TRIMMER POTENTIOMETERS OR THE LIKE

Filed July 11, 1963

INVENTOR.
RAYMOND C. ROOT
BY
Dick, Zarley & Hindron
ATTORNEYS

United States Patent Office 3,151,308
Patented Sept. 29, 1964

3,151,308
HOUSING FOR TRIMMER POTENTIOMETERS
OR THE LIKE
Raymond C. Root, Columbus, Nebr., assignor to Dale
Electronics, Inc., Columbus, Nebr.
Filed July 11, 1963, Ser. No. 294,323
2 Claims. (Cl. 338—184)

Trimmer potentiometers and related electrical components are commonly secured to a chassis deck or panel board. Usually, the potentiometer housing is placed in a mounting bracket to effect the connection of the potentiometer to a supporting surface. Obviously, the mounting bracket adds to the overall expense of the operation. A principal object of this invention is therefore to provide a housing for trimmer potentiometers or the like which utilizes mating housing portions wherein one portion effects the mounting function and the other carries the electrical components.

A still further object of this invention is to provide a housing for trimmer potentiometers or the like which utilizes mating housing portions wherein one portion carrying electrical components can be interchanged for a similar portion having electrical components of different design without interrupting the matching therewith of the other portion which effects the mounting function.

A still further object of this invention is to provide a housing for trimmer potentiometers or the like which will have high heat dissipating characteristics.

A still further object of this invention is to provide a housing for trimmer potentiometers or the like which is economical of manufacture, durable in use, and refined in appearance.

These and other objects will be apparent to those skilled in the art.

This invention consists in the construction, arrangements, and combination, of the various parts of the device, whereby the objects contemplated are attained as hereinafter more fully set forth, specifically pointed out in the claims, and illustrated in the accompanying drawing, in which:

Figure 2:
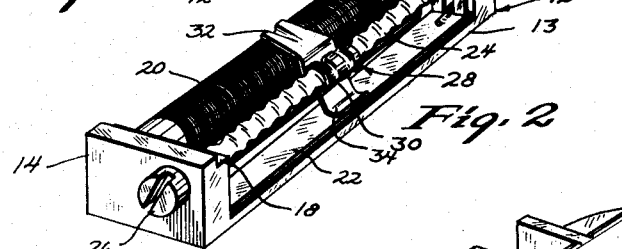
FIGURE 2 is a perspective view of the base housing with the conventional trimmer potentiometer elements mounted therein.

The numeral 10 generally designates a chassis deck upon which the housing of this invention would normally be mounted. A base housing 12 is comprised of a horizontal body portion 13 with upstanding ends 14 and 16 cast as an integral part thereof. The horizontal body portion 13 has a flat bottom which is adapted to rest upon the chassis deck 10. The horizontal body portion with the upstanding ends 14 and 16 comprise a compartment which is open at its sides and top. As clearly shown in FIGURE 2, the base housing 12 is substantially rectangular in shape insofar as its plan dimensions are concerned. Shoulders 18 in the upper ends of the upstanding ends 14 and 16 are adapted to register with and be received in the complementary grooves in the upper housing as will be discussed hereafter. The top surface of each of the shoulders 18 is in a parallel plane below the top surface of the associated end portion 14 or 16.

A conventional resistance coil 20 is mounted in conventional fashion on the base housing 12 in between the upstanding ends thereof as is a collector bar 22. A leadscrew 24 is rotatably supported by the upstanding ends 14 and 16 and the screw head 26 extends outwardly from the upstanding end 14 and is adapted to provide rotational movement to the leadscrew 24. A wiper assembly 28 includes an insulated bushing 30 which embraces the leadscrew 24 and is adapted for longitudinal movement along the leadscrew whenever the leadscrew is rotated in one of two directions. A wiper arm 32 is secured to the insulated bushing 30 and extends into electrical contact with the resistance coil 20. Wiper arm 34 is electrically connected to both the wiper arm 32 and the collector bar 22. Electrical leads 36 extend through the upstanding end 16 of the base housing 12 and are in electrical contact with the resistance coil 20 and the collector bar 22. The leads 36 extend through a sealed opening in the upstanding end 16 of the base housing.

Figure 1:
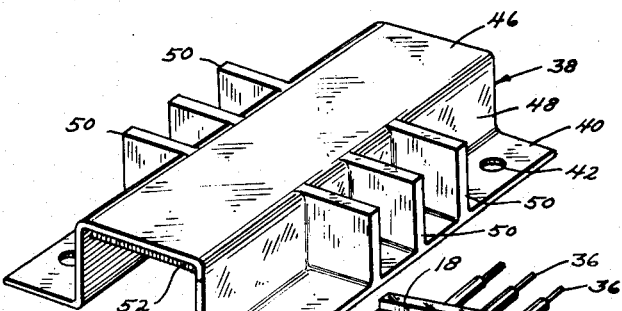
FIGURE 1 is a perspective view of the upper housing assembly of the device of this invention.
Figure 3:
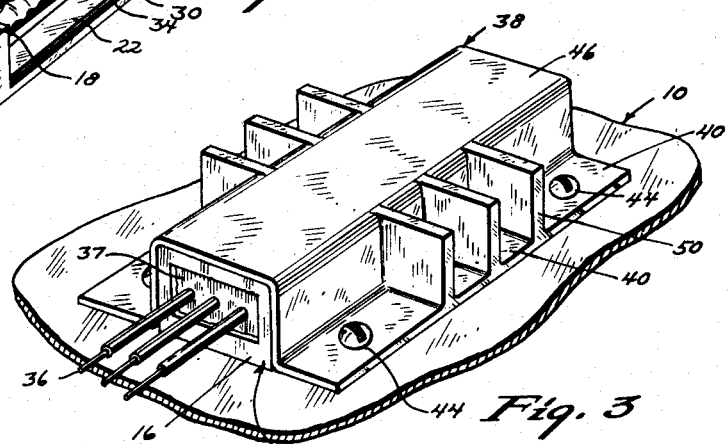
FIGURE 3 is a perspective view of the assembled base housing and upper housing position on a supporting deck.
Figure 4:
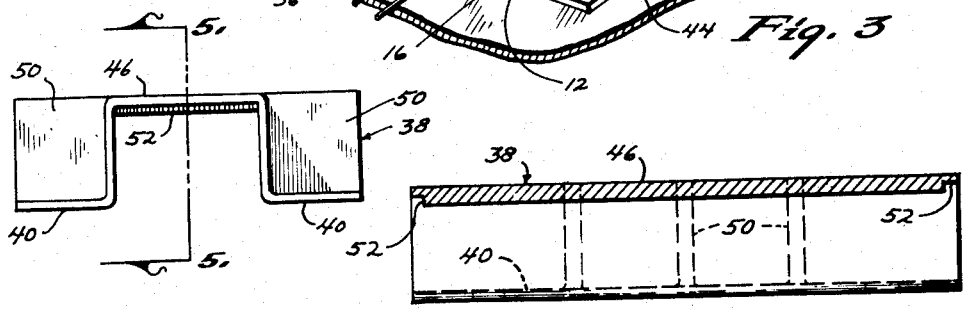
FIGURE 4 is an end elevational view of the upper housing.
Figure 5:
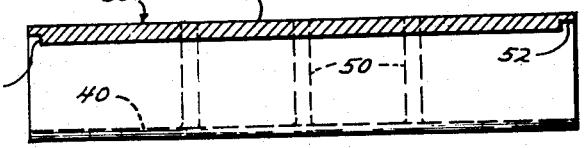
FIGURE 5 is a sectional view through the upper housing taken on line 5—5 of FIGURE 4.

An upper housing 38 has the cross sectional shape of an inverted U and it is complementary in shape to the base housing 12 to effect the closing of the top and side portions of the base housing. Both the upper housing 38 and the base housing 12 are of cast or molded construction. Horizontal flanges 40 extend outwardly from the bottom edges of the upper housing 38 and mounting holes 42 therein are adapted to cooperate with nut and bolt assemblies 44 to effect the connection of the upper housing to the supporting deck 10. Upper housing 38 has a flat top 46 and vertical sides 48. Vertical rib portions 50 extend laterally outwardly from the upper housing 38 and extend upwardly from the horizontal flanges 40 as clearly shown in FIGURES 1 and 3. Grooves 52 at the ends of the top 46 of upper housing 38 are complementary in shape to the grooves 18 in the upstanding ends 14 and 16 of the base housing. The shoulders 52 in the upper housing 38 are adapted to engage and lock with the shoulders 18 in the base housing 12 to prevent relative longitudinal movement between the upper and base housings. The vertical height of the upper housing 38 is such that when it rests in coextensive relation with the base housing, as shown in FIGURE 3, the bottom surfaces of the base housing and the horizontal flanges 40 of the upper housing will both dwell in the plane of the upper surface of deck 10.

The base housing 12 can be equipped with an electrical resistor 20 of any predetermined design. Thus, a base housing 12 of desired specifications can be selected and can be mated with an upper housing 38. Since the upper housing 38 can be used in conjunction with a plurality of base housings which incorporate electrical components of different specifications, a substantial savings in manufacturing is achieved because one upper housing is then capable of accommodating a plurality of different base housing designs.

When the desired base housing 12 has been selected, it is placed on the supporting deck 10 and the upper housing 38 is placed thereover so that the shoulders 52 of the upper housing register with the grooves 18 in the upstanding ends 14 and 16 of the base housing. The nut and bolt assemblies 44 are then actuated in conventional manner to effect the connection between the upper housing 38 and the deck 10. The connection of the upper housing to the deck also clamps the lower housing 12 in rigid connection with the deck and the interlocking shoulders and grooves of the two housings prevent any relative longitudinal movement from taking place between the two housings.

The upper housing 38 presents a substantial surface for heat dissipation purposes. The upstanding rib portions 50 not only serve to enhance the heat dissipation function, but they also serve to reinforce the structural characteristics of the upper housing.

Therefore, it is seen from the foregoing that this invention will accomplish at least all of its stated objectives.

Some changes may be made in the construction and arrangement of my housing for trimmer potentiometers or the like without departing from the real spirit and purpose of my invention, and it is my intention to cover by my claims, any modified forms of structure or use of mechanical equivalents which may be reasonably included within their scope.

I claim:

1. In a trimmer potentiometer having a resistance coil, a collector rod and a wiper element mounted on a lead screw wherein said wiper element is in electrical contact with said resistance element and said collector rod, a housing comprising, a base having a substantially flat bottom for mounting on a flat support surface, said base also having upstanding end portions and open side top portions, and said resistance coil, collector rod, wiper element and lead screw being secured within said housing, each of said end portions having a vertical end surface which merges with a horizontal top flat surface, said top flat surface extending inwardly of said base and merging with a vertical surface extending downwardly and merging with a shoulder surface extending inwardly along the longitudinal axis of said base, an upper housing member having a substantially inverted U-shaped cross-section including a bottom wall and a pair of side walls wherein said housing member is positioned downwardly over said base to close the top and side portions thereof, said bottom wall having a recess formed in the inner side of each end to matingly receive said shoulders on said end portions of said base, the length of said bottom wall being such that it extends over the top flat surfaces of said end portions and terminates in a vertical plane with said vertical end surfaces, a horizontal flange extending outwardly from the bottom edge of each of the side walls of the upper housing member, the bottom surface of said flange being in the plane with the bottom surface of said flat bottom of said base, detachable means for securing each of said flanges to the supporting surface whereby said upper housing member maintains said base member against said flat surface and prevents relative movement between said base and said flat surface.

2. The structure of claim 1 in which rib portions are provided integral with said upper housing member and extend the width of said flanges and the height of the side walls of said upper housing member, said ribs being spaced apart and extending upwardly of said flanges and outwardly of said upper housing side walls.

References Cited in the file of this patent

UNITED STATES PATENTS

| | | |
|---|---|---|
| 1,460,815 | Hynes | July 3, 1923 |
| 2,039,974 | Mucher | May 5, 1936 |
| 2,223,331 | Roesch et al. | Nov. 26, 1940 |
| 2,470,715 | Olivares | May 17, 1949 |
| 2,873,337 | Bournes et al. | Feb. 10, 1959 |
| 2,926,324 | Barden et al. | Feb. 23, 1960 |
| 2,954,537 | Scott et al. | Sept. 27, 1960 |